No. 828,389. PATENTED AUG. 14, 1906.
M. J. DAWKINS.
VEHICLE.
APPLICATION FILED DEC. 28, 1905.
2 SHEETS—SHEET 1.
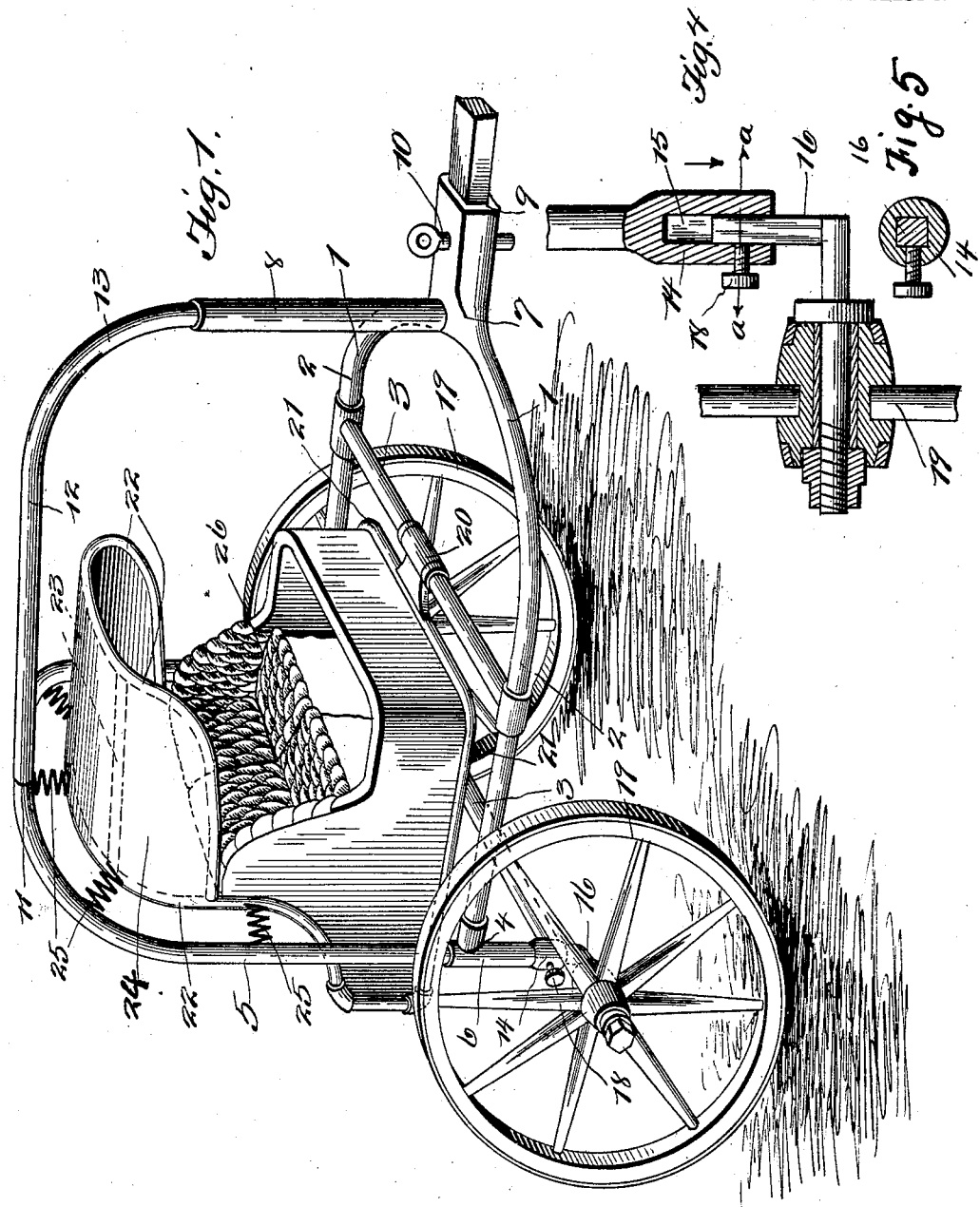
Witnesses
Inventor
M. J. Dawkins
By Swift &c.
Attorneys No. 828,389. PATENTED AUG. 14, 1906.
M. J. DAWKINS.
VEHICLE.
APPLICATION FILED DEC. 28, 1905.
2 SHEETS—SHEET 2.
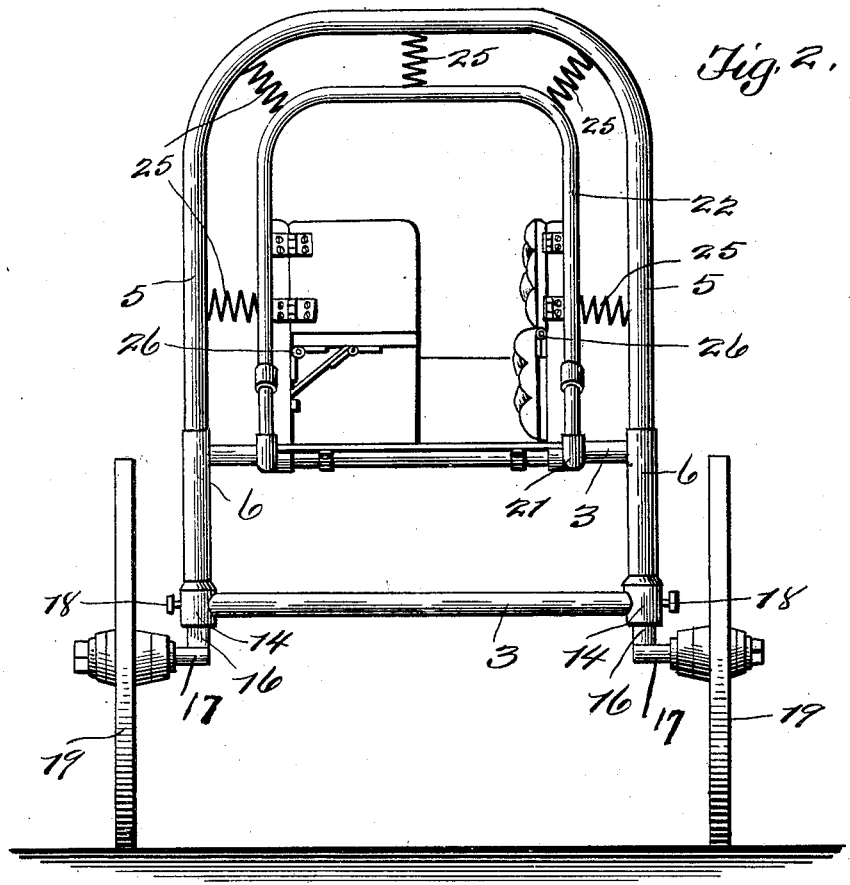
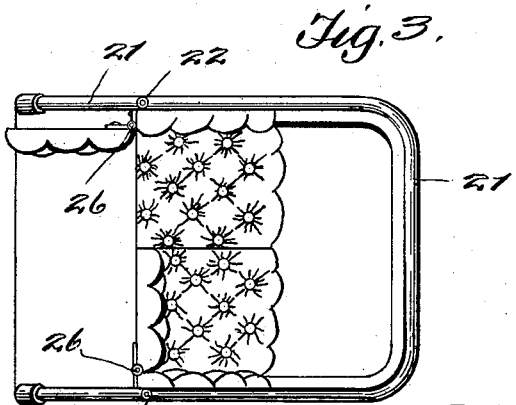

UNITED STATES PATENT OFFICE.

MATTHEW J. DAWKINS, OF RIVERSIDE, CALIFORNIA.

VEHICLE.

No. 828,389.  Specification of Letters Patent.  Patented Aug. 14, 1906.

Application filed December 28, 1905. Serial No. 293,621.

*To all whom it may concern:*

Be it known that I, MATTHEW J. DAWKINS, a citizen of the United States, residing at Riverside, in the county of Riverside and State of California, have invented new and useful Improvements in Vehicles; and I do hereby declare the following to be a full, clear, and exact description of the invention, such as will enable others skilled in the art to which it appertains to make and use the same.

This invention relates to certain new and useful improvements in vehicles, and more particularly to the two-wheeled type; and the object of the invention is to provide a device of this character having a body which is pivotally carried at one end, while the other end is mounted so as to act against the tension of coiled springs carried by the frame of the vehicle.

Another object of the invention is to construct the frame of the vehicle of hollow tubing, such as is used in manufacturing the frames of bicycles, the joints between the tubing being elbows or T-joints, or, if desired, the joints may be made by brazing the tubing, as is usually the case in the manufacturing of bicycle-frames. By constructing the frame of the vehicle as above set forth a very light and durable device is provided, which may be conveniently drawn by a team of horses or, if desired, may be drawn by any suitable motive power; but, as shown, the invention is adapted to be drawn by horses.

Another object of the invention is to provide a device of this character whereby the occupants may conveniently make their escape from the rear should the horses become frightened, thus causing a runaway, which will obviate the necessity of climbing from the side of the vehicle.

This invention comprises further objects and combinations of elements, which will be hereinafter more fully described, and shown in the accompanying drawings, and the novel features thereof will be particularly pointed out by the appended claims.

To obtain a full and correct understanding of the details of construction and combination of features, elements, and advantages, reference is to be had to the hereinafter set forth description, in connection with the accompanying drawings, wherein—

Figure 1 is a perspective view of the vehicle, plainly illustrating the invention. Fig. 2 is a rear view. Fig. 3 is a plan view of the body, the top being removed. Fig. 4 is a sectional view through the hub of one of the wheels, showing a portion of the rear arched section and the stub-axle. Fig. 5 is a transverse sectional view taken on line *a a* of Fig. 4.

Making renewed reference to the accompanying drawings, wherein similar reference characters indicate the corresponding parts in the several illustrations by figures, 1 designates the frame of a vehicle, comprising a pair of longitudinal lower side sections 2, which are suitably braced by lateral sections 3, as shown clearly in Fig. 1 of the acompanying drawings. The rear portions of the pair of longitudinal lower side sections, as at 4, are connected to an arch-formed section 5 by suitable T-joints 6. The joints of the different sections, however, are not to be limited to T-joints, or elbow-joints, but may be, if desired, brazed, as is usually the case in manufacturing bicycle-frames. The front portions of the side sections are curved slightly and cast, as at 7, to a vertical tubular standard 8, having a socket member 9 projecting at right angles to the standard 8. Said socket member 9 is adapted to receive the end of the tongue or projecting portion of shafts, as shown clearly in Fig. 1 of the accompanying drawings. A suitable pin 10 is provided to securely hold the socket member and tongue together.

Reaching from the top of the arched section 5, as at 11, is a tubular reach 12, which is curved slightly at its forward end, as at 13, and inserted within the tubular standard 8 in any suitable manner. The lower ends of the arch-formed section 5 are provided with enlargements 14, having sockets 15 to receive the vertically-disposed portions 16 of the stub-axles 17. Said vertically-disposed portions are held within the sockets 15 by set-screws 18, which set-screws will securely hold said stub-axles in the desired adjusted position. The journal portions of the stub-axles are adapted to have mounted thereon wheels 19 in the usual manner. Pivotally mounted, as at 20, is the lower tubular frame 21 of the body of the vehicle. Said tubular frame of the body is of rectangular contour and jointed together by T-joints, elbows, or by brazing. The body is provided with a pair of arch-formed tubular sections 22, which are joined together by longitudinal tubular sections 23. These sections 22 and 23 are provided with a canopy 24 for the purpose of shading the occupants. The rear arch-formed section 22 of the body is connected to the arch-formed section 5 by coiled springs 25 in such a manner as to allow the body to have resilient movement, so as to permit the occupants of the vehicle to ride easily and comfortably over rough roads. The body of the vehicle is provided with hinged backs and seats, as at 26, so as to allow the occupants to make their escape or to enter the vehicle from the rear, as shown clearly in the drawings.

From the foregoing it will be plainly observed that by the provision of a device as above described a very efficient and durable vehicle is provided, whereby the occupants of the same can easily make their escape from the rear in case of accident.

Having thus described the invention, what is claimed as new, and desired by the protection of Letters Patent, is—

1. A device of the character described, comprising a framework composed of tubular sections, a rear arch-formed section, joints for said sections, lateral braces for the framework, and a body pivotally carried by one of said lateral braces, and having spring connections with the rear arch-formed section.

2. A device of the character described, comprising a framework, lateral braces therefor, a rear arch-formed section connected to said framework, a body pivotally connected to one of said lateral braces, consisting of a framing of tubular sections, and a canopy for said body.

In testimony whereof I have hereto affixed my signature in the presence of two witnesses.

MATTHEW J. DAWKINS.

Witnesses:
MATHEW A. DAWKINS,
JOHN WHERRY.